United States Patent
Tan et al.

(10) Patent No.: US 7,965,626 B2
(45) Date of Patent: Jun. 21, 2011

(54) SYSTEM AND METHOD FOR TRANSFERRING DATA ON A DATA NETWORK USING MULTIPLE PATHS

(75) Inventors: Wai-tian Tan, Sunnyvale, CA (US); Gene Cheung, Musashino (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1499 days.

(21) Appl. No.: 10/911,456

(22) Filed: Aug. 3, 2004

(65) Prior Publication Data
US 2006/0028991 A1   Feb. 9, 2006

(51) Int. Cl.
*G01R 31/08* (2006.01)
(52) U.S. Cl. .................................. 370/228; 370/238
(58) Field of Classification Search .................. 370/216, 370/225, 226, 227, 228, 235, 237, 238, 238.1, 370/251, 252, 328, 329, 331, 332, 333, 356, 370/395.1, 395.64
See application file for complete search history.

(56) References Cited

U.S. PATENT DOCUMENTS

| | | | | |
|---|---|---|---|---|
| 5,933,425 | A * | 8/1999 | Iwata | 370/351 |
| 6,178,448 | B1 * | 1/2001 | Gray et al. | 370/468 |
| 6,195,354 | B1 | 2/2001 | Skalecki et al. | |
| 6,234,162 | B1 * | 5/2001 | Wenker | 126/29 |
| 6,259,673 | B1 * | 7/2001 | Yoshihara et al. | 370/238 |
| 6,781,996 | B1 * | 8/2004 | Hemmady | 370/395.21 |
| 6,862,618 | B1 * | 3/2005 | Gray et al. | 370/468 |
| 7,275,103 | B1 * | 9/2007 | Thrasher et al. | 709/224 |
| 2001/0055309 | A1 * | 12/2001 | Altstaetter | 370/403 |
| 2002/0018449 | A1 * | 2/2002 | Ricciulli | 370/268 |
| 2002/0114332 | A1 | 8/2002 | Apostolopoulos et al. | |
| 2002/0150041 | A1 * | 10/2002 | Reinshmidt et al. | 370/216 |
| 2002/0184382 | A1 | 12/2002 | Engel | |
| 2002/0186658 | A1 * | 12/2002 | Chiu et al. | 370/237 |
| 2003/0048750 | A1 * | 3/2003 | Kobayashi | 370/229 |
| 2003/0053463 | A1 * | 3/2003 | Vikberg et al. | 370/395.1 |
| 2003/0058798 | A1 * | 3/2003 | Fleischer et al. | 370/238 |
| 2005/0083848 | A1 * | 4/2005 | Shao et al. | 370/238 |
| 2005/0125688 | A1 * | 6/2005 | Ogawa et al. | 713/200 |
| 2005/0147031 | A1 * | 7/2005 | Bhatia et al. | 370/229 |

FOREIGN PATENT DOCUMENTS

JP    2004-007361    8/2004

* cited by examiner

*Primary Examiner* — Ricky Ngo
*Assistant Examiner* — Phuongchau B Nguyen

(57) ABSTRACT

Embodiments of the invention provide a system and method for transferring data on a data network using multiple paths. In one embodiment, data is transferred across a default path of a network. Next, a data loss rate is determined on the default path. When the data loss rate on the default path exceeds a first threshold value, a data loss rate is determined on a first alternate path. Provided the data loss rate on the first alternate path is less than a second threshold value, a first portion of the data is transferred to the first alternate path. Moreover, additional portions of data are transferred to the first alternate path until the data loss rate on the first alternate path meets or exceeds the second threshold value.

20 Claims, 6 Drawing Sheets

100

200

SYSTEM AND METHOD FOR TRANSFERRING DATA ON A DATA NETWORK USING MULTIPLE PATHS

TECHNICAL FIELD

The present invention generally relates to data network operations. More specifically to a system and method for transferring data on a data network using multiple paths.

BACKGROUND ART

There are many applications, such as streaming media, which require network throughput to be stable. In general, there are a number of ways to provide throughput in a network configuration such as a local area network (LAN), wide area network (WAN), Internet, and the like. A traditional approach to address varying throughput is to employ adaptation at the transmitting source to modulate throughput requirements of the source according to prevailing network conditions. For multimedia data, this typically requires media to be somehow rate-scalable. For live content, this often assumes the form of adaptive encoding. For stored content, mid-stream switching between multiple copies of the same content at different bit-rates is often employed.

However, some of the problems of the adaptive source schemes include complexity of producing and managing multiple copies, and large fluctuation in media quality as prevailing throughput varies. More importantly, most content exists in a stored, single-rate format, and is not compatible with the adaptive source model.

Another way to satisfy the throughput requirements of applications is to use multiple transmission paths simultaneously for a single data or streaming source. In such a way, if one path involves a throughput bottleneck, it is possible to bypass that bottleneck by using other paths Many of today's networks offer connectivity as a basic service, and traffic between two end-points traverse a prescribed default path. However, there are many practical settings in which the simultaneous use of multiple paths in addition to the default path is practical. For example, the next generation Internet Protocol, IPv6, supports "source routing" which allows transmitting source to explicitly specify the path traversed by every packet. The current public Internet does not support such source routing, however, the advent of more advanced network infrastructures in various forms of overlay networks and peer-to-peer networks, provide a platform in which data delivery using multiple paths may be practical. Specifically, these advanced infrastructures provide addition nodes that can relay traffic. In such a way, multiple paths can be realized by using different nodes for relaying traffic.

An example of overlay network is Content Distribution Networks (CDN), which is a caching infrastructure inside the Internet to improve response time and reduce network resource usage for Web traffic. It is called an overlay network because it relies on the Internet to deliver traffic to and from the nodes of the CDN.

The use of multiple paths can potentially lead to better quality of service. Nevertheless, in a system in which end applications are given free choices to use multiple paths, each instance of an application will allocate traffic among the available paths in a "selfish" way. That is, to maximize their own gain without regard to impact on other instances of the same or different applications. When selfish allocation is adopted by an application, a system that admits the flexibility of using multiple paths may perform worse than a system that allows only a single path. Thus, the flexibility in choosing paths that promise to improve performance can actually lead to inferior performance when coupled with the selfish behavior of end-applications.

The fact that choices coupled with selfish behavior can lead to inferior performance has been known for a long time in various contexts. Specifically, it has been known and observed for a long time in road traffic engineering that the construction of a new road may actually lead to longer driving times, a phenomenon often referred to as Braess' Paradox. Similar behavior has also been reported in many different contexts, including telephone networks in which call-blocking probability increases with added new lines.

DISCLOSURE OF THE INVENTION

Embodiments of the invention provide a system and method for transferring data on a data network using multiple paths. In one embodiment, data is transferred across a default path of a network. Next, a data loss rate is determined on the default path. When the data loss rate on the default path exceeds a first threshold value, a data loss rate is determined on a first alternate path. Provided the data loss rate on the first alternate path is less than a second threshold value, a first portion of the data is transferred to the first alternate path. Moreover, additional portions of data are transferred to the first alternate path until the data loss rate on the first alternate path meets or exceeds the second threshold value.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. RAM, ROM and a data storage device for storing instructions that can be processed by the computer system's processor are examples of a computer-usable medium with computer executable instructions stored thereon for causing a computer system to perform a method according to an embodiment.

Overview And Nomenclature

Embodiments of the invention provide a system and method for transferring data on a data network using multiple paths. That is, in one embodiment, the data transfer method of the present invention operates in a network but only allows unrestricted use of a direct path. Any alternate paths, e.g., an overlay network or the like, may still be used, however, they are constrained to the extent that no loss rate may result on the alternate path. That is, the loss rate (e.g., packet drop, missing data, etc.) on the alternate path must remain below (e.g. below a threshold value). Since the alternate path will therefore experience no congestion, there is no adverse impact on other network traffic along the alternate path, resulting in no increased performance degradation of other network traffic, and therefore the network.

Figure 1:
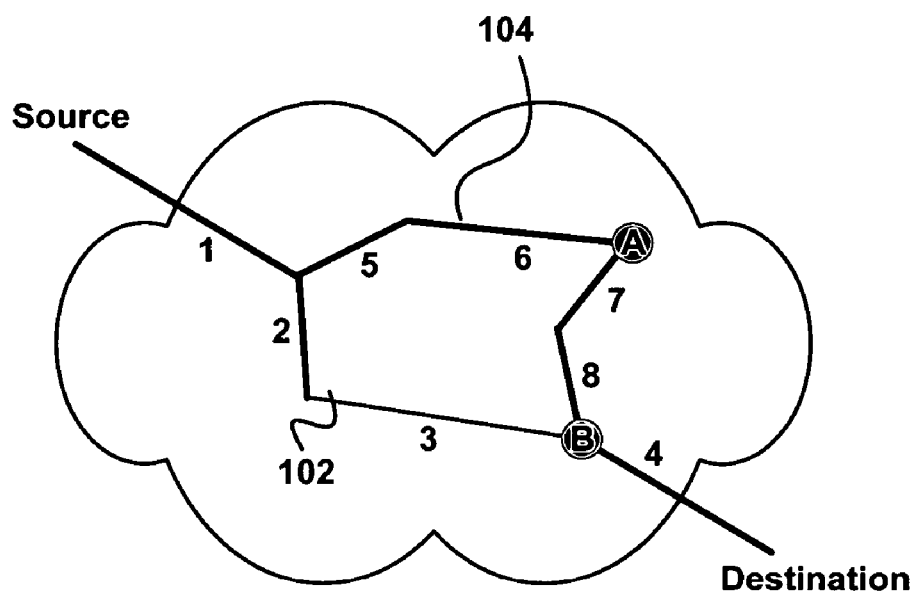
FIG. 1 is a diagram of an exemplary content distribution network in accordance with one embodiment of the present invention.

With reference now to FIG. 1, a diagram of an exemplary content distribution network is shown in accordance with one embodiment of the present invention. That is, an overlay route 104 (e.g., an alternate path) is shown bypassing a throughput bottleneck (link 3). In one embodiment, the direct path 102 is through links 1,2,3,4, and the overlay path 104 through node A is through links 1,5,6,7,8,4, which contains more links but may also have a larger throughput.

In some cases, overlay paths (alternate paths) can consume more resource and be less efficient than direct paths. For example, in network 100, the direct path 102 has only 4 hops while the overlay path 104 has 6 hops. In general, when overlay routing is made available to an application, it becomes possible to have an overall increase in resource consumption while achieving the same task, potentially leading to overall inferior performance. This inferior performance may even occur when each traffic stream is individually performing the best individual allocation of traffic among paths. For example, if an application is experiencing a 50 percent data loss rate on a direct path 102, the application may use an alternate path 104 to reduce the data loss rate to two 25 percent data loss rates instead of a single 50 percent data loss rate. In so doing, the traffic stream is performing the best allocation of traffic among the paths. However, the traffic stream is also bogging down 10 links instead of 4 in the direct path. Specifically, transmitting R amount of data using the direct path of 4 links uses resource of 4R. Transmitting_R on direct path and _R on the alternate path (6 links) uses resource of (4*_R)+(6*_R)=5R. If a second (or tenth, or the like) user is also using the network, they may also attempt to split their traffic and introduce more traffic on the network. In so doing, the average traffic on the network links is increased, resulting in higher loss rate. For example, the first user may see 60% loss rather than 50% when only the default path is used.

However, the present invention provides a method of limiting the "selfishness" of the application by limiting the data loss of the overlay path 104 on the network. That is, in one embodiment, no matter what the data loss rate is on the default path 102 (e.g., 50 percent), the data loss rate is not spread to the alternate path 104. Instead, the data loss rate of the alternate path is maintained below a threshold value. In addition, if there is a second user or application that accesses the network, both users started off by transmitting along there respectively default paths only. Their alternate paths may partially overlap with the default path of the other user. However, both users use their respective alternate paths only to a degree that there is no loss, they do not add to the congestion of the other user. As a result, inferior network performance is eliminated.

It is appreciated that the network may be any number of tiers and that any number of nodes may be utilized. That is, although in FIG. 1 only one set of nodes is shown, it should be understood that the present invention may be employed in a general network with a more complex topology. In so doing, the dynamics within each node are further complicated with the addition of intra-node transfer to normal inter-node navigation.

Figure 2:
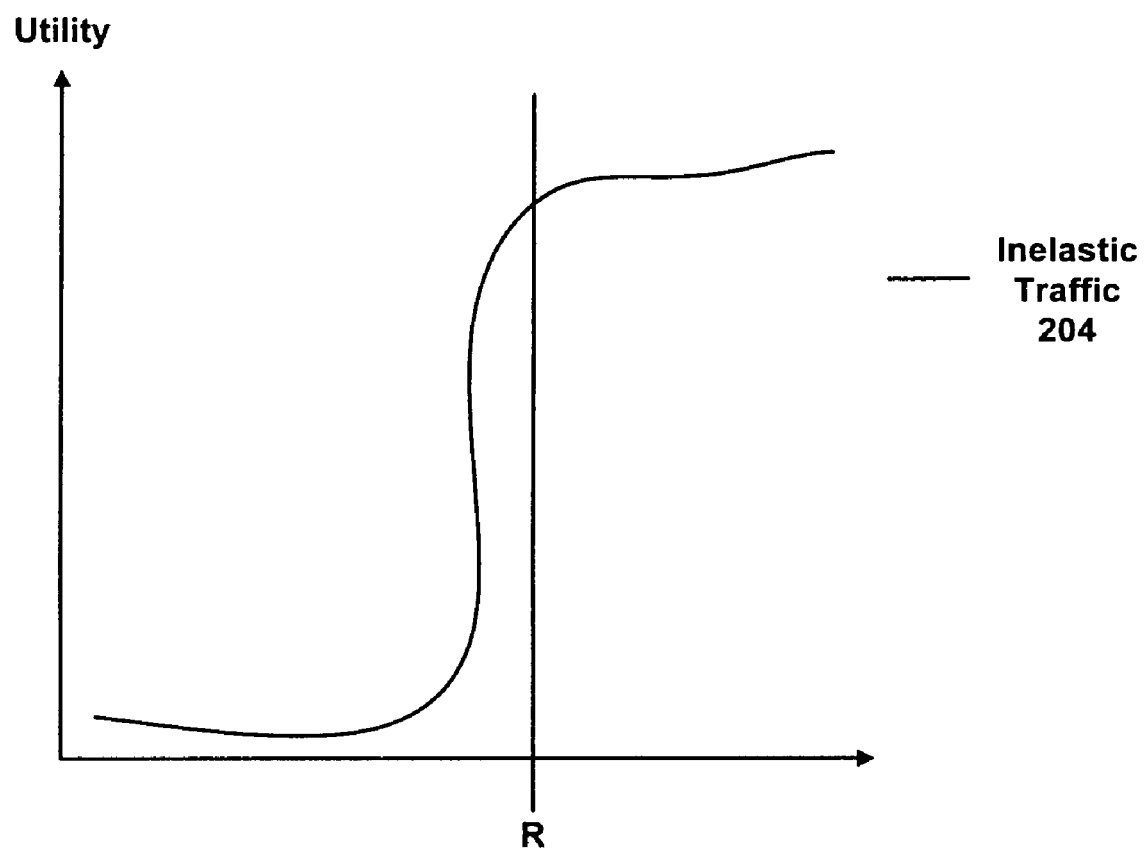
FIG. 2 is a graph of elastic versus inelastic network traffic.

With reference now to FIG. 2, exemplary traffic formats and their requirements are shown in accordance with an embodiment of the present invention. In one embodiment, as is well known in the art, video traffic 204 is inelastic. That is, video traffic coded at rate R demands sustained transfer rate of R, and finds rates lower than R unacceptable, and rates above R marginally useful. Due to the need for a sustained transfer rate of R for video, transmitted video traffic is used at a constant bit-rate stream regardless of network conditions. That is, whether the stream is using one path or a plurality of paths, a significant portion of the stream must be maintained in order to receive any video of value. In addition, when the network is passing a plurality of video data, it is important that each stream is maintained at rate R.

Implementation

Figure 3:
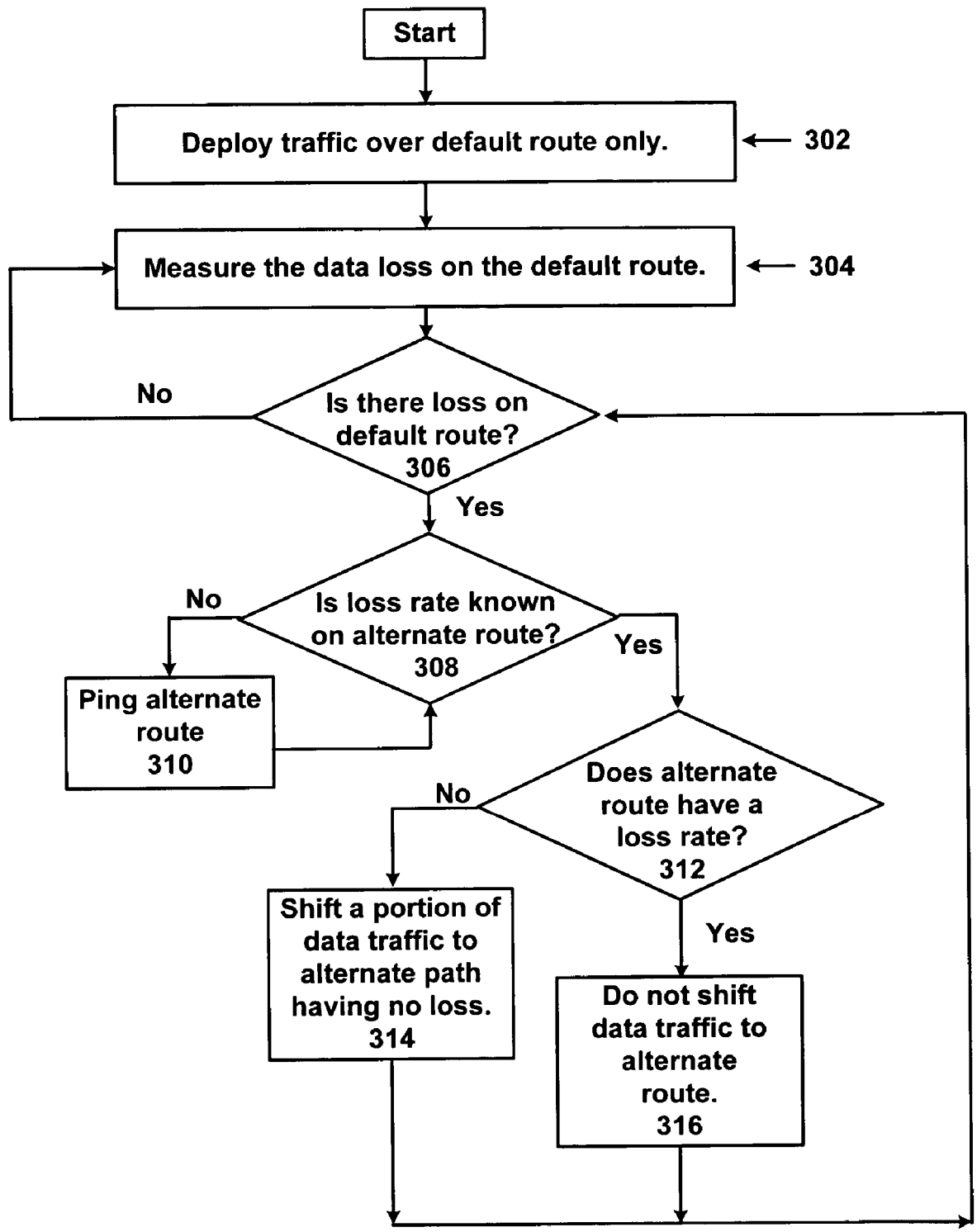
FIG. 3 is a flow diagram of the steps for transferring data on a data network using multiple paths in accordance with an embodiment of the present invention.

With reference now to FIG. 3, a flow diagram of the steps for transferring data on a network is shown in accordance with an embodiment of the present invention.

With reference now to step 302 of FIG. 3, initially the traffic is deployed over a default path only. That is, although a network supporting multiple paths is being utilized, an initial path (e.g., the default path) is selected for transferring the data. In one embodiment, the network assigns the default path. In another embodiment, the user or an administrator selects the default path.

Referring now to step 304 of FIG. 3, in one embodiment the data loss on the default path is measured. For example, while the data is being deployed over the default path, the loss rate of the default path is measured. In one embodiment, a ping may be used to measure the loss rate of the default path. Although a ping is used herein, it is appreciated that any measuring means known in the art may be used to measure the loss rate. The use of a ping is merely for purposes of clarity.

With reference now to step 306 of FIG. 3, the results of the measurement are analyzed. In other words, is there a loss on the default path? If there is no loss on the default path then the process repeats itself. That is, the traffic is deployed over the default path only and the default path is monitored for data loss. In one embodiment, the default path has a loss rate of a first threshold value. Moreover, in one embodiment, the first threshold value is zero. As will be described below, in various embodiments of the present invention, a threshold assumes a value of approximately 0.1 percent. Such a value is used in the various embodiments in order to ensure the data loss rate is sufficiently low to prevent a user from visually discerning degradation of a video stream due to data loss. However, it should be understood that the present invention is well suited to various other default values selected to meet various other needs. In one embodiment, if the loss on the default path surpasses the first threshold value (e.g., zero, 1%, 5%, 12%, 25% or the like) an alternate path is assessed. In general, the user may select the alternate path from an overlay network, or the application or the network may assign the alternate path. In one embodiment, there may be a plurality of alternate paths selected for analysis.

Referring now to step 308 of FIG. 3, a check is performed to see if the data loss rate on the alternate path is known. If the data loss rate is not known on the alternate path then a ping (e.g., step 310) is performed on the alternate path to determine the loss rate. Once the ping (or other testing process) has occurred, the resulting loss rate data is evaluated.

With reference now to step 312 of FIG. 3, the loss rate of the alternate path is analyzed to make sure it is below a second threshold value. That is, the loss rate of the alternate path is compared against the acceptable loss rate for the alternate path. In one embodiment, a second threshold value loss rate is a loss rate of less than approximately 0.1 percent. Although such a loss rate is considered the second threshold value in the present embodiment, the present invention is well suited to the using various other loss rates as the second threshold value. In one embodiment, the first threshold value, the second threshold value, and any additional threshold values may be the same. However, the present invention is well suited to having different threshold values for each path. Thus, there is a first threshold value for the default path, a second threshold value for the first alternate path, a third threshold value for the second alternate path, and so on, wherein they can all be the same or different, or some the same, or the like. In addition, in one embodiment, the threshold values may be variable. For example, the threshold values may be dependent on number of users in a network, demand on the network, time of day, priority of application, priority of the user, or the like.

Referring now to step 314 of FIG. 3, if the alternate path has a loss rate lower than the second threshold value, then a portion of the data traffic is shifted to the alternate path. Even though a portion of the data traffic is shifted to the alternate path, the data traffic transfer is also maintained over the default path. Additionally, once a portion of the data traffic is shifted to the alternate path, the question of the loss rate on the default path (e.g., step 306) is again addressed. That is, if there is no longer a loss on the default path (or the loss rate drops below the first threshold value), then the measuring of the data loss on the default path (e.g., step 304) is maintained but no further data is transferred.

However, if there is still a loss on the default path above the first threshold value, the process of transferring a portion of data to an alternate path is repeated in the same way as mentioned above with one caveat. If the data loss rate on the first alternate path in use is still minimal (e.g., below the threshold value) more data may be transferred to the first alternate path. This additional transfer of more portions of data to the first alternate path may continue until either the default path has a data loss rate below the first threshold value, or a loss rate which exceeds an acceptable negligent loss rate occurs on the first alternate path.

With reference now to step 316 of FIG. 3, if the loss rate on the first alternate path exceeds the acceptable second threshold value, then no further data is transferred to the first alternate path. In other words, no additional data traffic will be shifted to the first alternate path, and the first alternate path will maintain its previous load of shifted data traffic. In one embodiment, if the first alternate path begins to show a loss rate, the amount of data shifted to the first alternate path may be reduced to return the data loss rate of the first alternate path to a value below the second threshold value.

The process then returns to step 306, that is, checking to see if there is a loss on the default path. In one embodiment, the search for alternate paths (while the default path has losses) may be ongoing. For example, a plurality of alternate paths may be used to relieve the loss rate of the default path. Additionally, every possible alternate path may be monitored. For example, if on a first pass a second alternate path is showing a loss rate higher than the third threshold value, that second alternate path may be checked on the next pass to see if it is still showing a higher data loss rate than the third threshold value. If it is not, then the second alternate path may be utilized to relieve some of the losses from the default path.

However, if no lossless alternate path is found (or not enough lossless alternate bandwidth is found), the lossless method will maintain the loss rate at the default path only. Thereby ensuring that the losses are not propagated to other nodes and paths in the network. For example, as stated herein, no matter the number of alternate paths, the only path having a loss rate above threshold will be the default path. That is, the loss rate is not spread evenly across all the paths being utilized. Instead, only the default path may have a loss rate. By limiting the loss rate above first threshold value to only the default path, detrimental network degradation is reduced, and a more efficient unrestricted network is provided.

For purposes of analysis, in one embodiment, all traffic is assumed to be video streams in steady state operation in which no stream leaves and no new stream joins. The video streams are of rate 1 Mbps and have different source and destination in a network. Each video stream source has access to a default path and a set of alternate paths and would individually perform a gradient descent algorithm to shift traffic from more congested links to less congested link for the available paths until convergence is achieved.

To more thoroughly explain an exemplary embodiment of the present invention, a comparison of three multiple-path transmission schemes, a default scheme, an unrestricted scheme and a lossless scheme are used. Under the default scheme, only the default path can be used, and there is exactly one path to deliver media data.

The unrestricted scheme represents the straightforward implementation of a "selfish" multiple-path scheme in which a set of alternate paths is available for unrestricted use for all users. A system that implements unrestricted allows a user to split the traffic arbitrarily between the direct path and the set of alternate paths. Specifically, each user will optimize for his own gains by adaptively shifting traffic from higher-loss paths to lower-loss paths, until equilibrium is reached in which all paths with nonzero traffic have the same loss-rate. This condition represents an equilibrium point since a user will have no incentive to modify his traffic allocation. Each user started by sending all traffic along the direct path only, and gradually shifts the allocation of traffic from paths with higher instantaneous loss to paths with lower instantaneous loss using a gradient descent algorithm.

The unrestricted scheme represents one extreme of multiple path transmission since there is no restriction on the amount of network resources each user can use. The liberal use of multiple paths can lead to substantial system throughput improvement compared to the default scheme in some case, and substantial system throughput degradation in other cases.

The lossless scheme of the present invention represents a constrained use of multiple paths. Specifically, in order to ensure system throughput that is no lower than that achieved by the default scheme, the lossless scheme allows the use of an alternate path only when it is loss-free. In such a way, alternate path traffic will only traverse lossless links, and therefore will not incur additional congestion on any link, eliminating the possibility of system throughput degradation. In the case of lossless approach, each user attempts to adaptively change his traffic allocation to maximize gain without detrimentally affecting the entire network. A gradient descent algorithm that follows the rules below achieves this:

if a path (default or alternate) is loss-free, increase allocation for that path, and if an alternate path has losses that exceed an allowable limit, decrease allocation for that path.

It is clear from the rules above that alternate paths are treated differently than the default path. That is, a user has unrestricted use only of the default path, and can only use alternate paths that are loss-free. Therefore, the lossless scheme has the advantage that throughput degradation compared to the default scheme is guaranteed not to occur.

Figure 4:
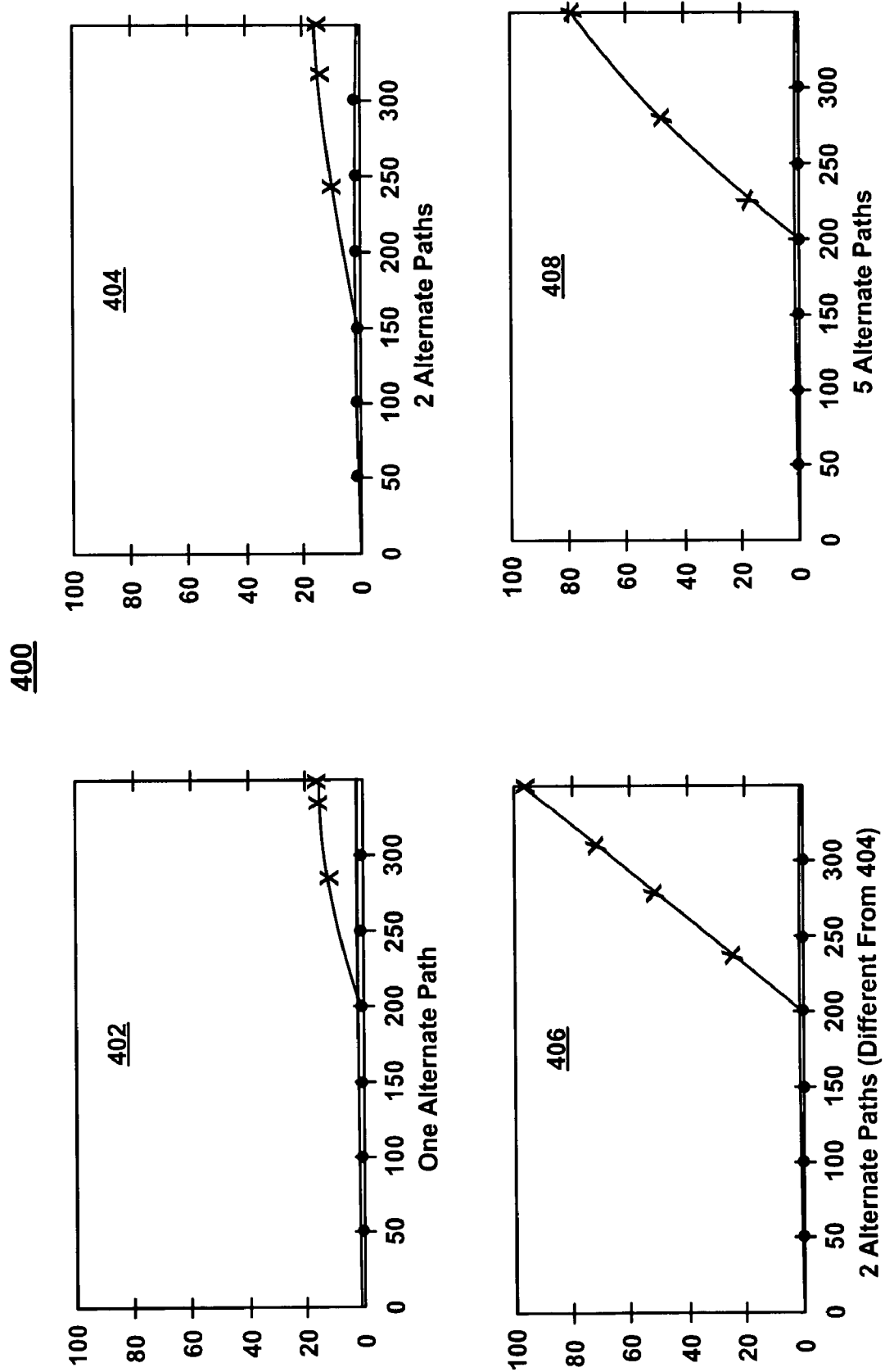
FIG. 4 is a set of graphs showing exemplary performance losses versus nodes and traffic loads in accordance with an embodiment of the present invention.

With reference now to FIG. 4, a set of graphs 402, 404, 406 and 408 of exemplary performance losses versus traffic loads for different number of alternate paths are shown in accordance with embodiments of the present invention. The marker "x" shows how often (in percent) do the performance of the unrestricted scheme fall below the default scheme, and the marker "o" shows how often (in percent) the performance of the lossless scheme fall below the default scheme. As shown in FIG. 4, the unrestricted scheme starts to under perform the default scheme when the total traffic exceeds 200 Mbps. At traffic of 300 Mbps, the unrestricted scheme can under performs the default scheme over 90% of the times. The number 200 Mbps has a special meaning in this example: it is the amount of traffic the network can handle before most network links are expected to be saturated. Therefore, the graphs of FIG. 4 show that the unrestricted scheme can lead to inferior performance compared to the default scheme in a significant number of cases when the network is saturated (e.g., as shown in graphs 402, 404, 406 and 408). It is also noted that in all circumstances, the lossless scheme achieves at least the same system throughput as the default scheme (e.g., as also shown in graphs 402-408). That is, since the lossless scheme only uses overlay paths that are lossless, it cannot add to the loss rate of other streams in the network.

Therefore, the utilizing of the lossless scheme is a way to supply the needed throughput when the default path proves insufficient. In addition, the design usage rules of the lossless scheme ensure that selfish behavior of individual users does not translate into disaster for the system. Therefore, by utilizing embodiments of the present invention, better performance is realized without the risk of occasionally achieving poorer performance.

Figure 5:
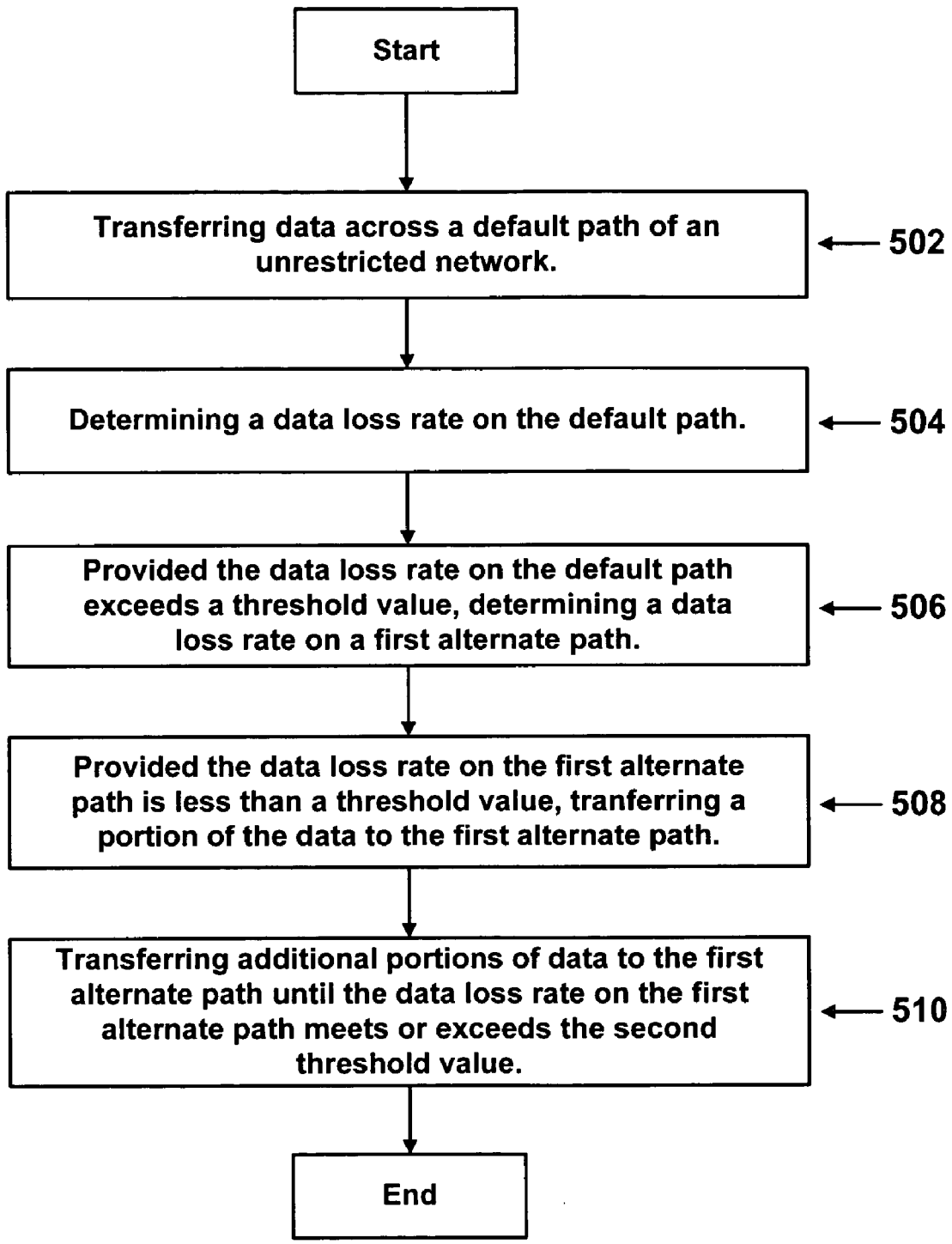
FIG. 5 is a flow chart of the steps for transferring data on a data network using multiple paths in accordance with one embodiment of the present invention.

With reference now to FIG. 5, a flow chart of the steps for transferring data on a network using multiple paths is shown in accordance with one embodiment of the present invention. In general, the lossless scheme allows unrestricted use of a default path only. Any additional paths, e.g., provided by an overlay network, may be used to the extent that no congestion results in those additional paths, (e.g., when the loss rate is less that a small threshold). Since the additional paths experience no congestion, it is guaranteed that there is no adverse impact of using them on other traffic, thereby causing no performance degradation in the network. Additionally, although embodiments may appear conservative, it provides performance close to the better of unrestricted and direct network schemes over a wide range of conditions as described herein.

With reference now to step 502 of FIG. 5, in one embodiment data is transferred across a default path of a network. In one embodiment, the network selects the default path. As illustrated in diagram 100 of FIG. 1, the default path may be path 102 providing a path from the source to the destination. In another embodiment, the user may select the default path.

Referring now to step 504 of FIG. 5, in one embodiment a data loss rate is determined on the default path. For example, while the data flow is maintained through the default path, the default path loss rate is measured. If no loss is identified or detected on the default path 102 of FIG. 1, there is no need to take any further action.

With reference now to step 506 of FIG. 5, in one embodiment provided the data loss rate on the default path exceeds a first threshold value, a first alternate path is selected and the data loss rate of the first alternate path is determined. That is, once loss is identified on the default path (e.g., 102 of FIG. 1), an alternate path (e.g., 104 of FIG. 1) is identified. In one embodiment, the network selects the alternate path 104. In another embodiment, the alternate path 104 is not selected by the unrestricted network but is instead selected by a separate entity. In other words, the alternate path 104 may be selected by software, by a user, by a default, or the like.

During the selection of an alternate path 104 (of FIG. 1), the suggested or assigned alternate path 102 is checked for a data loss rate prior to transferring any data across it. That is, after the alternate path 104 is selected, it must have a data loss rate below a second threshold value before any data or portion of data will be passed from the default path to the alternate path. In one embodiment, when the alternate path 104 is checked, if a data loss rate of 0.1% or more is present, the transfer of data to the alternate path 104 does not occur. In so doing, the alternate path 104 may not be overloaded. This limitation will prevent one application or data file from overloading more than one path on a network and causing loss over a plurality of network paths.

Moreover, no matter how large the data loss rate of the default path is, the alternate path will not incur a data loss rate. That is, the data loss rate is not spread across each path in the network until it is equaled out between all the possible paths. Instead, a data loss rate may occur only on the default path. Therefore, although data loss is occurring on the default path, it is not being spread across the network in a "selfish" fashion. For example, the default path may have a loss of 80 percent, and the alternate path will still remain lossless.

In another embodiment, there may be a plurality of alternate paths and each may be monitored for data loss. If one alternate path initially shows data loss but later shows no data loss, a portion of the data from the default path may be passed to the now open alternate path. Therefore, the number of alternate paths may be up to the maximum number of alternate paths on the network. In one embodiment, the only limitation to possible alternate paths is the number of nodes in a network. In another embodiment, each data transfer may be limited to a default path and a certain number of alternate paths. For example, in one embodiment, there may be an alternate path limit of four. Although a path limit of four is stated herein, it is appreciated that the path limit may be any number up to and including the maximum number of alternate paths available in the network.

With reference now to step 508 of FIG. 5, in one embodiment, provided the data loss rate on the alternate path is less than a second threshold value, a portion of the data from the default path is passed to the alternate path (or paths). In addition, the amount of data being passed to the alternate path may continue being increased to further remove the burden (or reduce the loss rate) across the default path. For example, a second portion of data may be passed to the alternate path. In one embodiment, the amount of data passed to the alternate path may continue to increase until either the data loss on the default path falls below the first threshold value, or the alternate path begins to show a data loss higher than the second threshold value.

With reference now to step 510 of FIG. 5, in one embodiment, additional portions of data are transferred to the alternate path until the data loss rate of the first alternate path meets or exceeds the second threshold value. That is, the portion of data transferred over the alternate path is limited, such that the portion of data transferred over the alternate path does not push the alternate path over its threshold value. For example, the data being transferred to the alternate path may be increased only until data loss above the second threshold value occurs on the alternate path. That is, the data being transferred from the default path to the alternate path may be limited when the data loss rate on the alternate path reaches 0.1%. Although 0.1% is used herein, the second threshold data loss rate for limiting the data transferred to the alternate path may be any percentage of loss either dictated by the network or the administrator (or user) of the network.

In one embodiment, once the alternate path begins to show data loss, the data being transferred to the alternate path (e.g., 104 of FIG. 1) is reduced to a data transfer rate that results in no loss of data on the alternate path. In one embodiment, this reduction will be performed on the alternate path regardless of the loss rate of the default path. Therefore, if a further dissemination of the data is needed to reduce data loss on the default path, a search must be made for a second alternate path that has no data loss. For example, a second alternate path is selected or assigned. A data loss rate is determined on the second alternate path. Provided the data loss rate on the second alternate path is less than a third threshold value, a portion of data is transferred to the second alternate path. In general, the operation and rules regarding the second (or fourth or tenth) alternate path are the same as the rules regarding the first alternate path. As such, it is possible that the data may be passed across a default path and one or more alternate paths. Thus, efficiency in a multi-path network is possible without the detrimental effect of one application or data file clogging a plurality of network paths and negatively affecting the overall network operation.

However, in one embodiment, no matter how high the default path loss rate is, the alternate path(s) will remain at a data loss rate below the specified threshold value. Additionally, the alternate paths threshold values may be adjusted or specified by a user or administrator of the network. In addition, each threshold value may be dynamically adjustable based on the number of users or applications on the network or the data traffic being passed across the network. For example, if only a single application is passing data on the network, the threshold values may be higher for the alternate path(s). However, if there is a plurality of users, the threshold values may be lowered for the alternate paths.

In one embodiment, the threshold values may be varied in real time or near real time based on the network usage. In other words, if a single user is on the network and passing high amounts of data, the alternate path thresholds may be high, but, when another user or application accesses the network, the alternate path thresholds may be lowered. In that case, the first user may notice a marked increase in data loss rate over the default path as the alternate path or paths reduce the portion of the data they are transferring.

Figure 6:
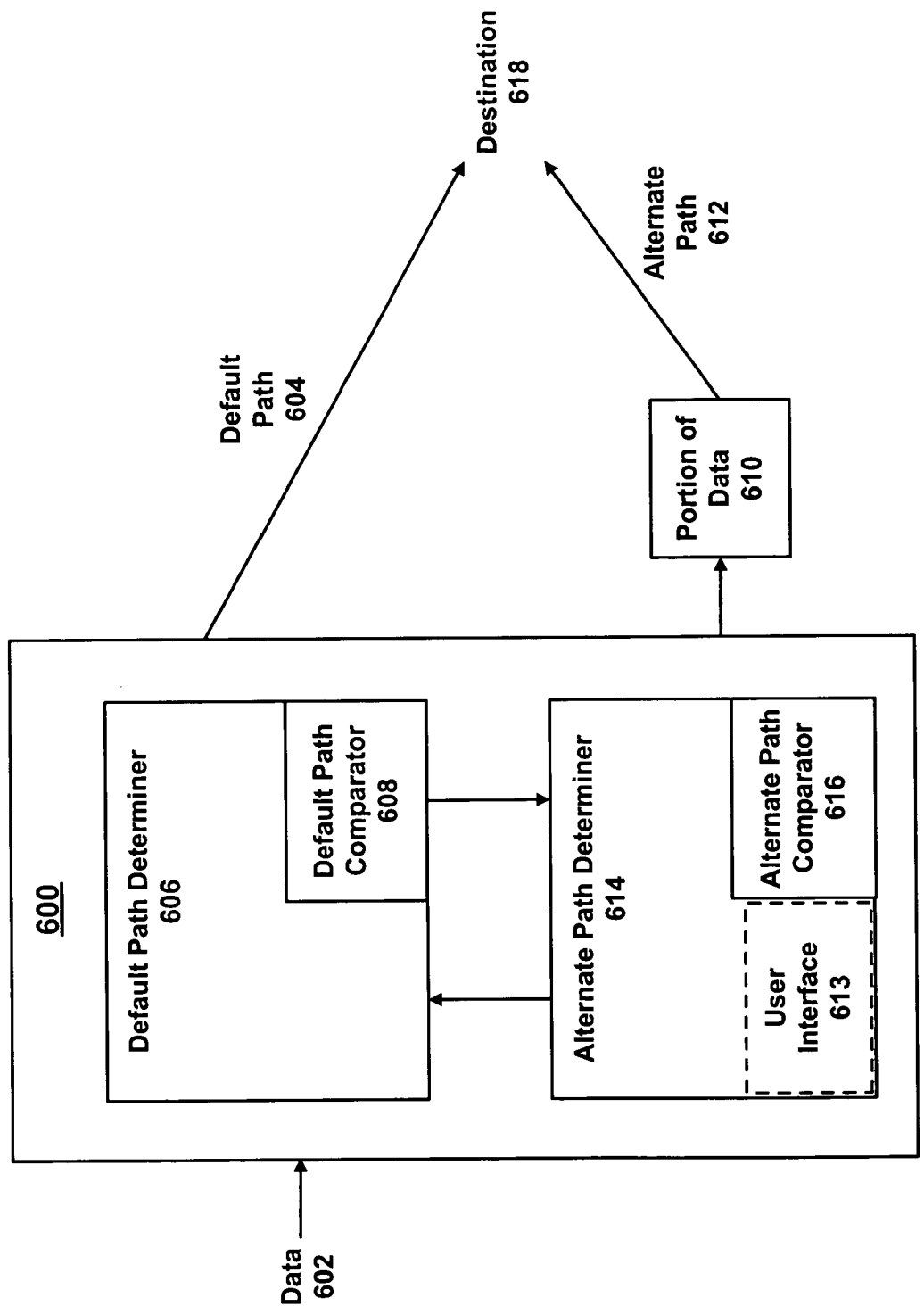
FIG. 6 is a block diagram of a device for transferring data on a data network using multiple paths in accordance with one embodiment of the present invention.

With reference now to FIG. 6, a device for transferring data on a network supporting multiple-paths is shown in accordance with one embodiment of the present invention. Device 600 includes a default path determiner 606 with a default path comparator 608, and an alternate path determiner 614 with an alternate path comparator 616. In one embodiment, the components of device 600 may be distributed or centrally located in a network. That is, the components may reside for example, in a central node or may reside in all different nodes or any combination thereof.

As described in detail herein, in one embodiment, data 602 needs to pass to node 618 on a network (e.g., the destination). Initially, the default path 604 is utilized to perform the transfer operation. While the default path 604 is transferring the data, device 600 is monitoring the data transfer rate. That is, within device 600, a default path determiner 606 monitors the data loss rate of default path 604. In addition, operating in default path determiner 606 is a default path comparator 608 logic that compares the data loss rate of the default path 604 with the first threshold value. In other words, a first threshold value is input into default path comparator 608 (either automatically or manually and in one embodiment, subject to real time modification). When the data loss rate as determined by the default path determiner 606 is equal or greater than the first threshold value of the default path comparator 608, action is taken.

In one embodiment, device 600 selects an alternate path. The alternate path may be automatically selected or may be selected manually. For example, the alternate path may be selected by user input 613. Once the alternate path 612 is selected, the device 600 utilizes the alternate path determiner 614 to determine the data loss rate of the alternate path 612. The alternate path comparator 616 then compares the data loss rate of the alternate path with the second threshold value stored therein (in the same manner as described above). If the alternate path comparator 616 determines the alternate path has a data loss rate below the second threshold value, then a portion of data 610 is passed from the default path 604 to the alternate path 612. However, if the alternate path comparator 616 determines that the alternate path 612 has a data loss rate at or above the second threshold value, then no further portion of data 610 is passed over the alternate path 612.

That is, whether or not the alternate path 612 is already passing data in support of default path 604 is unimportant. In either case, if the alternate path has a data loss rate on or above the threshold value, then no greater amount of data will be passed from the default path 604 to the alternate path 612.

In one embodiment, as stated herein, there may be a large number of alternate paths 612 passing a plurality of portions of data 610. In another embodiment, the number of alternate paths 612 passing data for a single default path 604 may be limited (e.g., limited to four paths). Although four is stated herein, any number may be the limiting number. Furthermore, the number of alternate paths may be limited dynamically. For example, if there is only one user the number of alternate paths may be the network maximum. However, if there is a plurality of users, the number of alternate paths available to each user may be limited to a portion of the network maximum.

For example, in a network having 8 possible alternate paths, if only a single user is accessing the network, all 8 alternate paths may be made available. However, if a second user accesses the network, both users may only be allowed access to 4 alternate paths each. Additionally, if four users access the network each user may only receive 2 alternate paths. In another embodiment, the access to the alternate paths may be limited to a users need. For example, one user may receive access to 4 alternate paths while the other 3 users receive access to only one alternate path each. In yet another embodiment, two users may share the same alternate path 612. Therefore, it is appreciated that the allotment of the alternate paths may be fixed or variable, and may be based on users, traffic, applications, status, or the like.

Thus, embodiments of the present invention provide methods and systems for transferring data on a network using multiple paths. By using a lossless scheme, crowding of the network nodes and network traffic degradation can be significantly reduced. Moreover, data transfer is increased with respect to a direct path network due to the ability to use a non-lossy path of an overlay network. In addition, by maintaining a second, third, fourth, etc. additional non-lossy path on the network, and providing path-sharing rules, a user does not have to worry about another user clogging a plurality of alternate paths. That is, since data can only cause loss on the direct path, and will only be provided up to the beginning of loss on the alternate path, the network will not become clogged due to an application or data stream acting on a plurality of paths throughout the network.

Embodiments of the present invention are thus described. While the present invention has been described in particular embodiments, it should be appreciated that the present invention should not be construed as limited by such embodiments, but rather construed according to the following claims.

We claim:

1. A method for transferring data on a data network using multiple paths comprising:
    transferring data across a default path of said network;
    determining a data loss rate on said default path at a device at a node of said network;
    provided said data loss rate on said default path exceeds a first threshold value;
        determining the data loss rate on a first alternate path at said device at said node of said network;
        provided said data loss rate on said first alternate path is less than a second threshold value and is less than said data loss rate on said default path;
            transferring a first portion of said data to said first alternate path while maintaining transferring said data across said default path; and
            transferring additional portions of said data to said first alternate path, wherein said additional portions of data are transferred to said first alternate path until said data loss rate on said first alternate path meets or exceeds said second threshold value.

2. The method of claim 1 wherein when said data loss rate on said first alternate path exceeds the second threshold value the portions of data transferred to said first alternate path are reduced regardless of the loss rate of said default path.

3. The method of claim 1 further comprising:
    determining the data loss rate on a second alternate path; and
    provided said data loss rate on said second alternate path is less than a third threshold value;
    transferring a second portion of said data to said second alternate path.

4. The method of claim 3 further comprising:
    provided said data loss rate on said second alternate path is less than said third threshold value;
        transferring a third portion of said data to said second alternate path.

5. The method of claim 4 wherein additional portions of said data are transferred to said second alternate path until said data loss rate on said second alternate path exceeds said third threshold value.

6. The method of claim 1 wherein a maximum of four alternate paths are utilized.

7. The method of claim 1 wherein the second threshold value of said first alternate path is 0.1 percent.

8. A device at a node of a data network for transferring data on said data network using multiple paths, said device comprising:
    a default path determiner configured to determine a data loss rate on a default path;
    a default path comparator coupled with said default path determiner, said default path comparator configured to compare said data loss rate on said default path with a first threshold value;
    an alternate path determiner communicatively coupled with said default path determiner, said alternate path determiner configured to determine a data loss rate on an alternate path; and
    an alternate path comparator coupled with said alternate path determiner, said alternate path comparator configured to compare said data loss rate on said alternate path with a second threshold value;
    such that provided the data loss rate on the default path exceeds the first threshold value and the data loss rate on the alternate path is less than the second threshold value and is less than said data loss rate on said default path, said device is configured to transfer a first portion of data from said default path to said alternate path while maintaining transfer of said data across said default path.

9. The device of claim 8 wherein said alternate path determiner is configured to determine multiple alternate paths.

10. The device of claim 9 wherein a maximum of four alternate paths are utilized by said alternate path determiner.

11. The device of claim 8 wherein said alternate path determiner further comprises:
    a user interface configured to allow a user to select said alternate path from a list of alternate paths.

12. The device of claim 8 wherein said device is configured to transfer additional portions of said data to said first alternate path, wherein said additional portions of data are transferred to said first alternate path until said data loss rate on said first alternate path meets or exceeds said second threshold value.

13. The device of claim 8 wherein said device is configured to cease transferring said portions of data to said alternate path when said data loss rate on said first alternate path exceeds the second threshold value regardless of the loss rate of said default path.

14. The device of claim 8 wherein the second threshold value of said first alternate path is 0.1 percent.

15. A non transitory computer-usable storage medium with computer executable instructions stored thereon for causing a computer system to perform a method for transferring data on a data network using multiple paths comprising:
    transferring data across a default path of said network;
    determining a data loss rate on said default path at a device at a node of said network;
    provided said data loss rate on said default path exceeds a first threshold value;
        determining the data loss rate on a first alternate path at said device at said node of said network;

provided said data loss rate on said first alternate path is less than a second threshold value and is less than said data loss rate on said default path;

transferring a first portion of said data to said first alternate path while maintaining transferring said data across said default path; and transferring additional portions of said data to said first alternate path, wherein said additional portions of data are transferred to said first alternate path until said data loss rate on said first alternate path meets or exceeds said second threshold value.

16. The non transitory computer-usable storage medium of claim 15 wherein when said data loss rate on said first alternate path exceeds the second threshold value the number of portions of data transferred to said first alternate path are reduced regardless of the loss rate of said default path.

17. The non transitory computer-usable storage medium of claim 15 further comprising:

determining the data loss rate on a second alternate path; and provided said data loss rate on said second alternate path is less than a third threshold value;

transferring a second portion of said data to said second alternate path.

18. The non transitory computer-usable storage medium of claim 17 further comprising:

provided said data loss rate on said second alternate path is less than said third threshold value;

transferring a third portion of said data to said second alternate path.

19. The non transitory computer-usable storage medium of claim 15 wherein a maximum of four alternate paths are utilized.

20. The non transitory computer-usable storage medium of claim 15 wherein the second threshold value of said first alternate path is 0.1 percent.

* * * * *